(12) United States Patent
Qiu et al.

(10) Patent No.: US 11,368,692 B2
(45) Date of Patent: Jun. 21, 2022

(54) CONTENT ADAPTIVE QUANTIZATION STRENGTH AND BITRATE MODELING

(71) Applicant: ATI Technologies ULC, Markham (CA)

(72) Inventors: Jinbo Qiu, Markham (CA); Yang Liu, Toronto (CA); Ihab Amer, Stouffville (CA); Lei Zhang, Richmond Hill (CA); Edward A. Harold, Scarborough (CA); Zhiqi Hao, Richmond Hill (CA); Jiao Wang, Maple (CA); Gabor Sines, Toronto (CA); Haibo Liu, North York (CA); Boris Ivanovic, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/177,128

(22) Filed: Oct. 31, 2018

(65) Prior Publication Data

US 2020/0137389 A1     Apr. 30, 2020

(51) Int. Cl.
*H04N 19/124* (2014.01)
*H04N 19/176* (2014.01)
*H04N 19/172* (2014.01)

(52) U.S. Cl.
CPC ......... *H04N 19/124* (2014.11); *H04N 19/172* (2014.11); *H04N 19/176* (2014.11)

(58) Field of Classification Search
CPC ... H04N 19/124; H04N 19/172; H04N 19/176

(Continued)

(56) References Cited

U.S. PATENT DOCUMENTS

2005/0047504 A1    3/2005  Sung et al.
2006/0192860 A1*   8/2006  Atsumi ............. H04N 1/33307
                                                      348/222.1

(Continued)

FOREIGN PATENT DOCUMENTS

WO    2009149564 A1    12/2009
WO    2018010852 A1    1/2018

OTHER PUBLICATIONS

International Search Report and Written Opinion in International Application No. PCT/IB2019/057945, dated Dec. 9, 2019, 8 pages.

(Continued)

*Primary Examiner* — Joseph G Ustaris
*Assistant Examiner* — Matthew David Kim
(74) *Attorney, Agent, or Firm* — Kowert Hood Munyon Rankin and Goetzel PC; Rory D. Rankin (57) ABSTRACT

Systems, apparatuses, and methods for generating a model for determining a quantization strength to use when encoding video frames are disclosed. A pre-encoder performs multiple encoding passes using different quantization strengths on a portion or the entirety of one or more pre-processed video frames. The pre-encoder captures the bit-size of the encoded output for each of the multiple encoding passes. Then, based on the multiple encoding passes, the pre-encoder generates a model for mapping bit-size to quantization strength for encoding video frames or portion(s) thereof. When the encoder begins the final encoding pass for one or more given video frames or any portion(s) thereof, the encoder uses the model to map a preferred bit-size to a given quantization strength. The encoder uses the given quantization strength when encoding the given video frame(s) or frame portion(s) to meet a specified bit-rate for the encoded bitstream.

20 Claims, 7 Drawing Sheets

(58) Field of Classification Search
USPC .................................................. 375/240.03
See application file for complete search history.

(56) References Cited

U.S. PATENT DOCUMENTS

| | | | | |
|---|---|---|---|---|
| 2007/0058718 | A1* | 3/2007 | Shen | H04N 19/577 |
| | | | | 375/240.12 |
| 2012/0057784 | A1* | 3/2012 | Horiuchi | H04N 19/124 |
| | | | | 382/166 |
| 2014/0269919 | A1 | 9/2014 | Rodriguez | |
| 2014/0376624 | A1 | 12/2014 | Li et al. | |
| 2015/0055706 | A1 | 2/2015 | Xu et al. | |
| 2015/0256850 | A1 | 9/2015 | Kottke et al. | |
| 2016/0029024 | A1* | 1/2016 | Shand | H04N 19/428 |
| | | | | 375/240.03 |
| 2017/0359601 | A1* | 12/2017 | Sievers | H04N 21/234363 |
| 2018/0109804 | A1 | 4/2018 | Saeedi | |
| 2018/0184092 | A1* | 6/2018 | Jung | H04N 19/154 |
| 2019/0045210 | A1 | 2/2019 | Guermazi et al. | |

OTHER PUBLICATIONS

International Search Report and Written Opinion in International Application No. PCT/IB2019/055358, dated Nov. 18, 2019, 7 pages.
"Co-occurrence matrix", Wikipedia.org, Sep. 7, 2016, 2 pages, https://en.wikipedia.org/wiki/Co-occurrence_matrix. [Retrieved Jul. 31, 2018].

* cited by examiner

CONTENT ADAPTIVE QUANTIZATION STRENGTH AND BITRATE MODELING

BACKGROUND

Description of the Related Art

Various applications perform encoding and decoding of images or video content. For example, video transcoding, desktop sharing, cloud gaming and gaming spectatorship are some of the applications which include support for encoding and decoding of content. One of the parameters determining how content is encoded is the quantization parameter (QP). In various block-based video encoding schemes, such as those that comply with the H.264 standard, the QP regulates how much detail is preserved during the encoding process. The QP selected for each video frame or each block of the frame is directly related to the size of the encoded video frame or size of the encoded block. Selecting lower QP values will retain more detail while yielding larger encoded sizes. Selecting higher QP values will cause more detail to be lost while producing smaller encoded sizes. It is noted that the term "quantization parameter" can also be referred to more generally as "quantization strength".

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for generating and implementing video encoding models for mapping encoded video frame bit-size to quantization strength are disclosed herein. In one implementation, a system includes at least an encoder, a pre-encoder, and a memory coupled to the encoder and pre-encoder. The pre-encoder runs multiple pre-encoding passes on at least a portion of an input video frame. In one implementation, the input video frame is pre-processed prior to the pre-encoding passes. Each pre-encoding pass uses a different quantization strength setting. In one implementation, the quantization strength setting refers to a particular quantization parameter (QP) used during the encoding process. For each pre-encoding pass, the pre-encoder captures the output bit-size of the encoded portion(s) of the input video frame. The pre-encoder uses the captured output bit-sizes to generate a model for mapping encoded video bitstream bit-size to quantization strength.

Before the encoder encodes the portion(s) of the input video frame, the encoder uses the model to map a specified bit-size to a corresponding quantization strength. In one implementation, the encoder provides a specified bit-size to the model and the model outputs the quantization strength value which will produce the specified bit-size. Then, the encoder encodes the portion(s) of the input video frame using the quantization strength value provided by the model so as to meet a given bit budget. In one implementation, by using the quantization strength value provided by the model, the encoder is able to make fewer quantization strength adjustments during the frame. This helps to improve the visual quality of the resulting encoded video bitstream.

Figure 1:
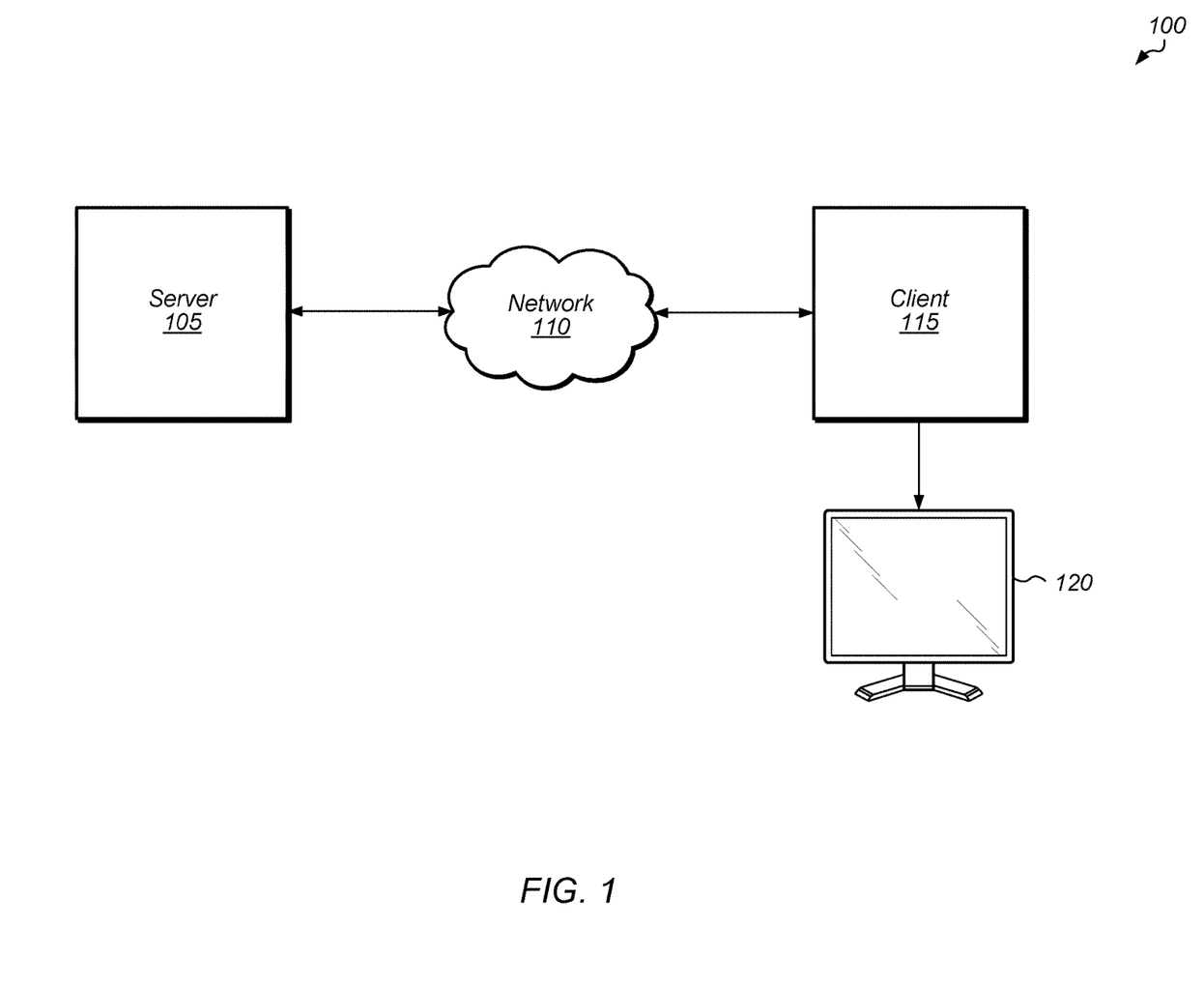
FIG. 1 is a block diagram of one implementation of a system for encoding and decoding content.

Referring now to FIG. 1, a block diagram of one implementation of a system 100 for encoding and decoding content is shown. System 100 includes server 105, network 110, client 115, and display 120. In other implementations, system 100 includes multiple clients connected to server 105 via network 110, with the multiple clients receiving the same bitstream or different bitstreams generated by server 105. System 100 can also include more than one server 105 for generating multiple bitstreams for multiple clients.

In one implementation, system 100 implements encoding and decoding of video content. In various implementations, different applications such as a video game application, a cloud gaming application, a virtual desktop infrastructure application, or a screen sharing application are implemented by system 100. In other implementations, system 100 executes other types of applications. In one implementation, server 105 renders video or image frames, encodes the rendered frames into a bitstream, and then conveys the encoded bitstream to client 115 via network 110. Client 115 decodes the encoded bitstream and generates video or image frames to drive to display 120 or to a display compositor.

Quantization is the mechanism used in video standards (e.g., high efficiency video coding (HEVC) standard, advanced video coding (AVC)) to control the size of an encoded video stream to meet the bandwidth requirements of a particular video application. This allows system 100 to send an encoded video stream from server 105 to client 115 in a consistent manner. It can be challenging to control the bit-rate of an encoded video stream while also providing an acceptable picture quality. In one implementation, the preferred bitcount of each video frame is equal to the bit-rate of the encoded video stream divided by the frame-rate of the video sequence. It is noted that the term "bitcount" is used interchangeably herein with the term "bit-size". In one implementation, server 105 adjusts the quantization parameter (QP) used to encode an input video sequence to control the bitcount of each frame of the encoded video stream. In this implementation, server 105 generates a model which maps bitcount to QP. Depending on the implementation, server 105 receives an indication of a desired bitcount or server 105 calculates a desired bitcount for each video frame. Once server 105 knows the desired bitcount of each video frame, server 105 uses the model to map the desired bitcount to a particular QP value. Then, server 105 sets the QP to this particular QP value when encoding a given video frame. In one implementation, server 105 generates a different model for each video frame (or a portion of each video frame). In other implementations, server 105 reuses a given model for multiple video frames.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 110 includes remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames, generating a model mapping bitcount to QP, and/or encoding the frames into a bitstream using the QP provided by the model. In one implementation, server 105 includes one or more software applications executing on one or more processors of one or more servers. Server 105 also includes network communication capabilities, one or more input/output devices, and/or other components. The processor(s) of server 105 include any number and type (e.g., graphics processing units (GPUs), central processing units (CPUs), digital signal processors (DSPs), field programmable gate arrays (FPGAs), application specific integrated circuits (ASICs)) of processors. The processor(s) are coupled to one or more memory devices storing program instructions executable by the processor(s). Similarly, client 115 includes any combination of software and/or hardware for decoding a bitstream and driving frames to display 120. In one implementation, client 115 includes one or more software applications executing on one or more processors of one or more computing devices. In various implementations, client 115 is a computing device, game console, mobile device, streaming media player, or other type of device.

Figure 2:
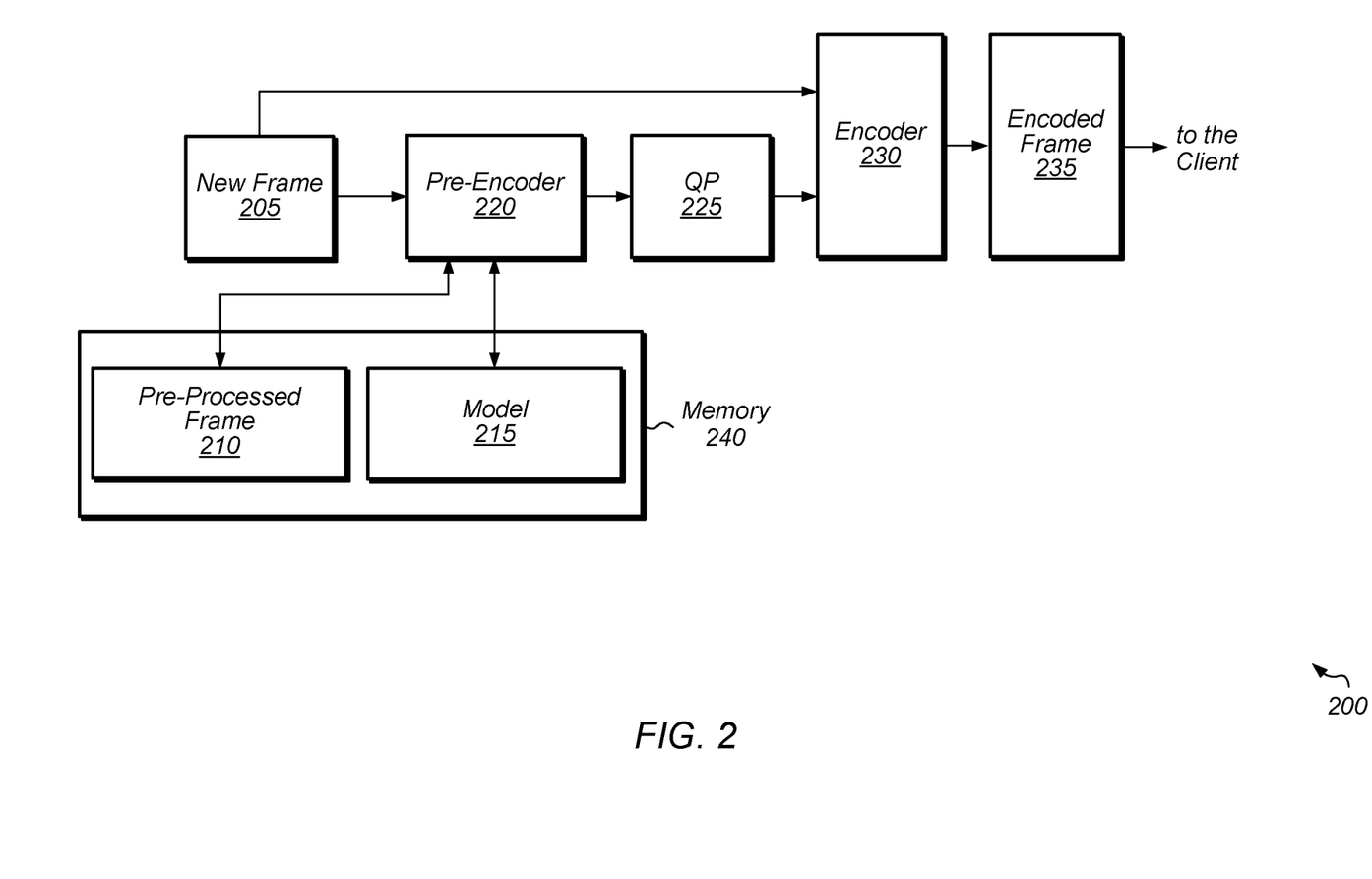
FIG. 2 is a block diagram of one implementation of the software components of a server for encoding frames of a video.

Turning now to FIG. 2, a block diagram of one implementation of the software components of a server 200 for encoding frames of a video are shown. It is noted that in other implementations, server 200 includes other components and/or is arranged in other suitable manners than is shown in FIG. 2. A new frame 205 of a video is received by server 200 and provided to pre-encoder 220 and encoder 230. Each of pre-encoder 220 and encoder 230 is implemented using any suitable combination of hardware and/or software. Pre-encoder 220 generates quantization parameter (QP) 225 to be used by encoder 230 when encoding new frame 205. In one implementation, pre-encoder 220 generates QP 225 based on model 215. In one implementation, model 215 identifies a target QP 225 to use for achieving a specified bit rate or bit size of encoded frame. It is noted that the term "encoded frame" can also be referred to as a "compressed frame".

In one implementation, pre-encoder 220 receives pre-processed frame 210 and performs one or more operations on pre-processed frame 210. In another implementation, pre-encoder 220 generates pre-processed frame 210 from new frame 205. In one implementation, pre-processed frame 210 is a downsampled version of new frame 205. In other implementations, pre-processed frame 210 represents new frame 205 after one or more other types of operations (e.g., filtering) are performed on new frame 205 other than or in addition to downsampling. In one implementation, pre-processed frame 210 is stored in memory 240. Memory 240 is representative of any number and type of memory or cache device(s) for storing data and/or instructions associated with the encoding process. Depending on the implementation, pre-processed frame 210 corresponds to the entirety of the original new frame 205 or to a portion thereof.

In one implementation, pre-encoder 220 performs multiple pre-encoding passes on pre-processed frame 210 so as to generate model 215. For example, in one implementation, pre-encoder 220 performs a first pre-encoding pass on pre-processed frame 210 with a first QP setting to determine the bit-size of the output frame for the first QP setting. Also, in this implementation, pre-encoder 220 performs a second pre-encoding pass on pre-processed frame 210 with a second QP setting to determine the bit-size of the resultant encoded frame for the second QP setting. It is assumed for the purposes of this discussion that the second QP setting is different from the first QP setting. Pre-encoder 220 can also perform additional pre-encoding passes with other QP settings. After capturing the bit-sizes of the encoded frames for the different passes at different QP settings, pre-encoder 220 generates model 215 to map QP setting to bit-size. Then, the desired bit size is provided to model 215 to generate a corresponding QP 225.

Encoder 230 receives new frame 205 and encodes new frame 205 using a QP value equal to QP 225 generated by pre-encoder 220. In one implementation, when encoder 230 starts encoding new frame 205, encoder sets the starting QP value to be equal to the QP 225 generated by model 215. Adjustments can be made to the starting QP value during the encoding of new frame 205 if encoder 230 determines that the amount of encoded data being generated is drifting too far from the target bit-size. The output of encoder 230 is encoded frame 235 which is conveyed to one or more clients (e.g., client 115 of FIG. 1) and/or stored in memory. In one implementation, pre-encoder 220 generates a new model 215 and QP 225 for each new frame 205. In another implementation, pre-encoder 220 reuses model 215 and QP 225 for one or more subsequent frames. In a further implementation, pre-encoder 220 generates model 215 from a portion of new frame 205 and then uses model 215 to generate QP 225 to be used for the encoding of other portions of new frame 205. In a still further implementation, pre-encoder 220 generates multiple models 215 for new frame 205, with each model 215 representing a different portion of new frame 205. In this implementation, pre-encoder 220 generates multiple QP values 225 to be used for encoding the different portions of new frame 205. Generally speaking, pre-encoder 220 generates QP value 225 for encoding new frame 205 based on a bit rate that has been selected for the resulting encoded bit stream. By selecting an appropriate starting QP value 225, encoder 230 will typically make fewer QP adjustments during encoding of new frame 205. This will help to improve the visual quality of the resulting encoded frame 235.

Figure 3:
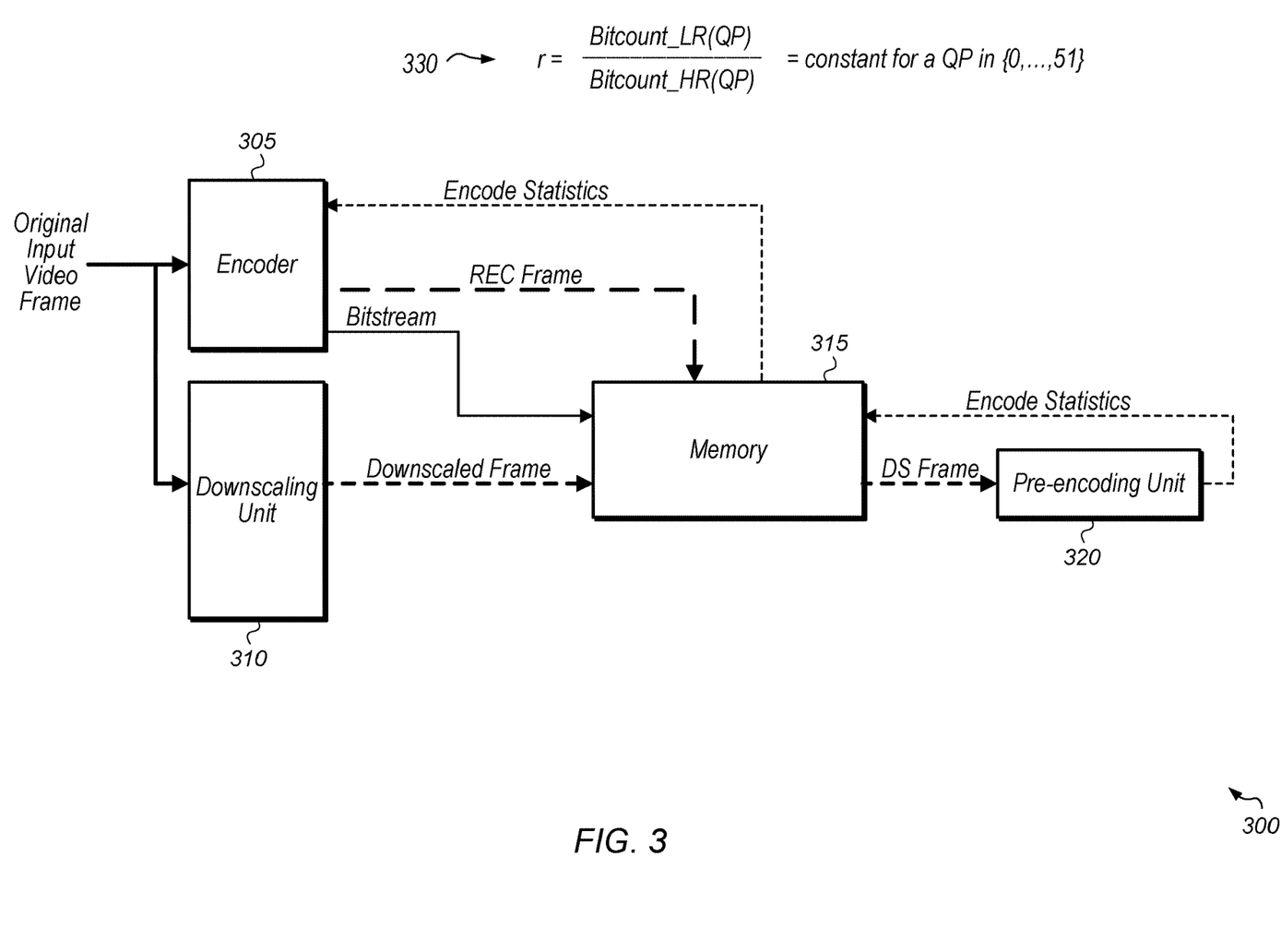
FIG. 3 is a block diagram of one implementation of encoding logic.

Referring now to FIG. 3, a block diagram of one implementation of encoding logic 300 is shown. An original input video frame is received by encoder 305 and downscaling unit 310. In one implementation, the original input video frame is in the YUV color space. In other implementations, the original input video frame is encoded in other color spaces. Encoder 305 encodes the input video frame and generates an encoded bitstream which is conveyed to memory 315. Memory 315 is representative of any number and type of memory devices. In one implementation, the encoded bitstream is formatted according to the high efficiency video coding (HEVC) standard. In one implementation, the encoded bitstream is formatted according to the advanced video coding (AVC) standard. In other implementations, the encoded bitstream is formatted according with other video coding standards.

Downscaling unit 310 generates a downscaled frame from the original input video frame and conveys the downscaled frame to memory 315. A downscaled frame can be used to generate a model for mapping bitcount to QP due to the relationship shown in equation 330. As indicated by equation 330, for a given video frame, the ratio between the bitcount of a low resolution version of a given video frame and the bitcount of a high resolution version of the given video frame is a constant for a given QP. Accordingly, a downscaled frame is processed by pre-encoding unit 320 at different QPs and the relationship between the resulting bitcounts will be representative of the relationship between bitcounts for different QPs used to encode the original frame. In other implementations, downscaling unit 310 performs other types of filtering and/or preprocessing on the input video frame in addition to or other than downscaling. For example, in other implementations, downscaling unit 310 performs denoising, grayscale conversion, and/or other types of pre-processing steps.

The downscaled frame is conveyed to pre-encoding unit 320. In one implementation, pre-encoding unit 320 performs at least two separate encodings of the downscaled frame using different QPs. In some implementations, pre-encoding unit 320 performs at least two separate encodings of a portion of the downscaled frame using different QPs. Then, based on the sizes of the encoded frames (or sizes of the encoded portions of the frame), pre-encoding unit 320 creates a model to map output bit-size to QP. The statistics for this model, labeled "encode statistics", are stored in memory 315. The encode statistics are also conveyed to encoder 305. Encoder 305 uses the encode statistics when determining which QP to select for the input video frame so as to meet a desired bit-size for the resulting encoded frame. In one implementation, the desired bit-size for each encoded frame is determined based on a desired bit-rate of the encoded bitstream generated by encoder 305. For example, in one implementation, the desired bit-rate is specified in bits per second (e.g., 3 megabits per second (Mbps)) and the frame rate of the video sequence is specified in frames per second (fps) (e.g., 60 fps, 24 fps). In this implementation, encoder 305 divides the desired bit-rate by the frame rate to calculate a desired bit-size for each encoded frame.

It is noted that in other implementations, encoding logic 300 performs variations to the above-described techniques for selecting an optimal quantization strength for encoding video data to meet a given bit budget. For example, in another implementation, pre-encoding unit 320 encodes a portion of a frame with different quantization strength settings. Pre-encoding unit 320 then captures the bit-size of the encoded portion at the different quantization strength settings. In a further implementation, pre-encoding unit 320 encodes two or more frames with different quantization strength settings and then captures the bit-sizes of corresponding encoded frames.

Figure 4:
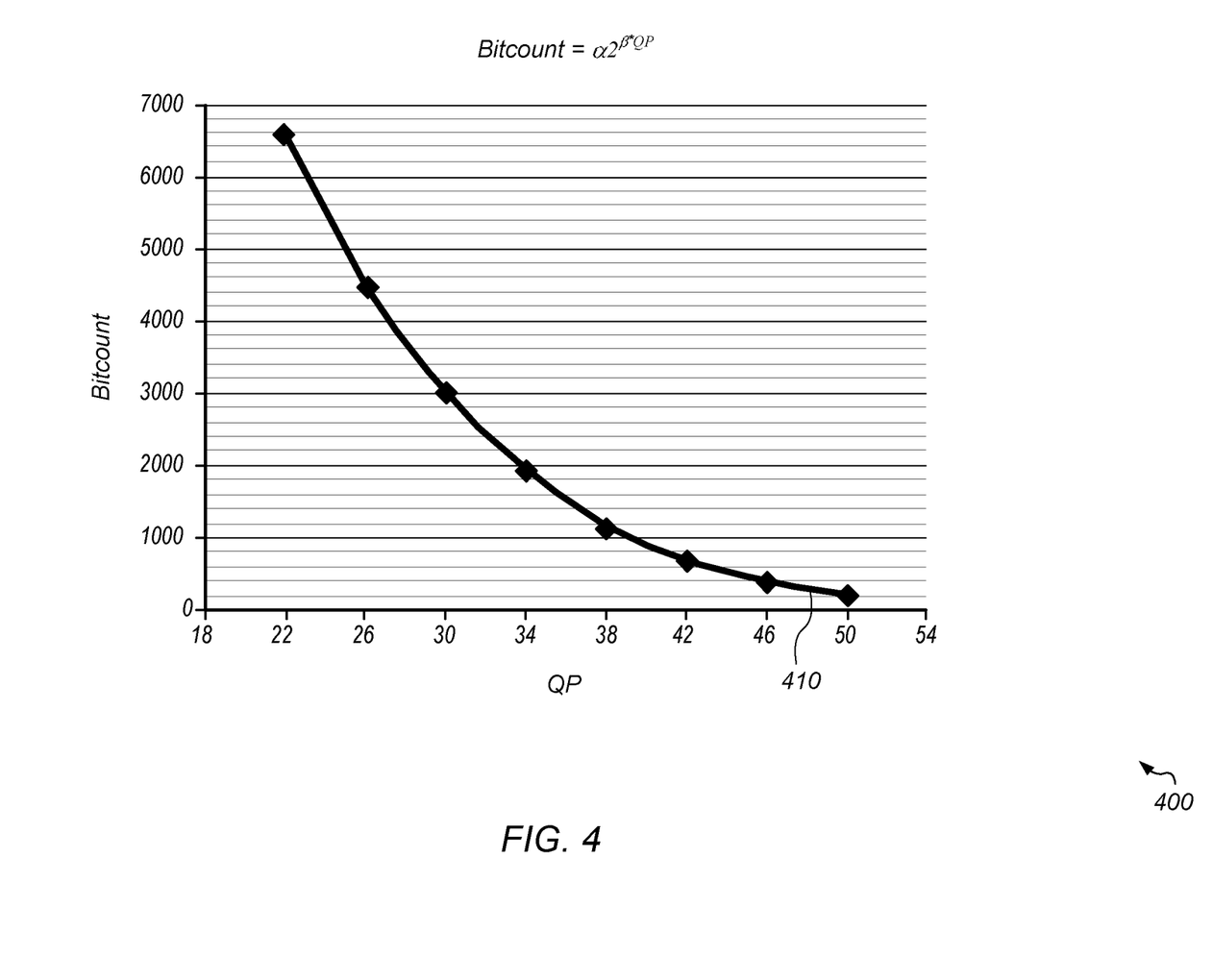
FIG. 4 illustrates one example of a graph mapping QP to bitcount.

Turning now to FIG. 4, one example of a graph 400 of mapping bitcount to QP is shown. Plot 410 represents the bitcounts for different values of QP used for encoding a particular frame, a portion of a frame, or two or more frames of a video sequence. In one implementation, the relationship between bitcount and QP is modeled using the formula: bitcount=$\alpha 2^{\beta*QP}$. In one implementation, the values for $\alpha$ and $\beta$ are determined by experimentation. For example, in one implementation, the values for $\alpha$ and $\beta$ are determined by pre-encoding a portion or the entirety of a frame using two or more different QP's in two or more different pre-encoding passes. The sizes of the encoded portion or entirety of the frame are captured, and then the QP's and captured bit-sizes are used to solve for the values of $\alpha$ and $\beta$ in the above equation. Next, the values for $\alpha$ and $\beta$ are used to generate a model which determines the relationship between bitcount and QP. When the encoder determines a desired bitcount for a given video frame, the encoder uses the model to map the desired bitcount to a particular QP value. The encoder then uses the particular QP value when encoding the given video frame so as to generate an encoded video frame with the desired bitcount.

Figure 5:
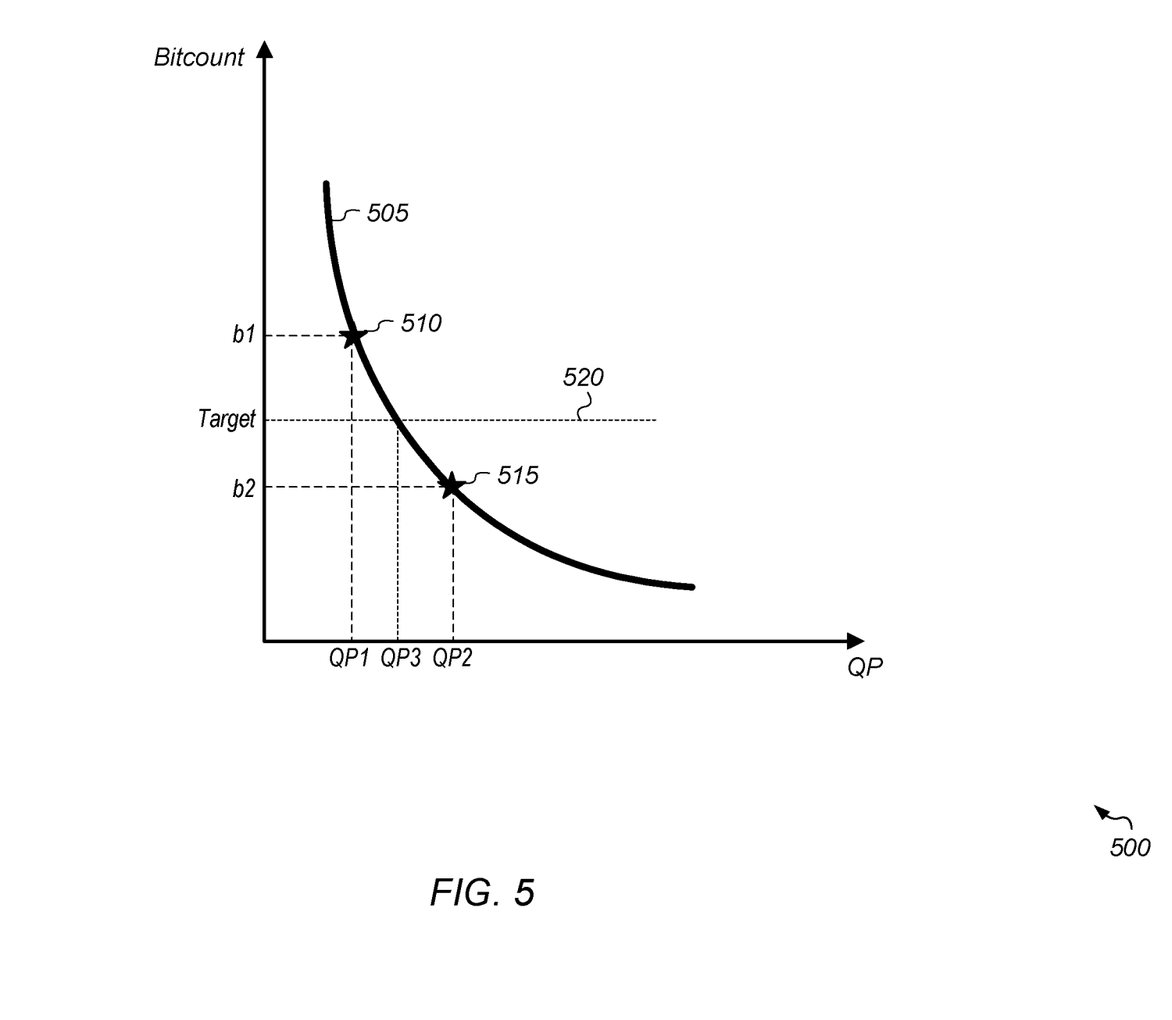
FIG. 5 illustrates one implementation of a graph for determining a QP value to match a target bitcount.

Referring now to FIG. 5, one implementation of a graph 500 for determining a QP value to match a target bitcount is shown. In one implementation, control logic or a pre-encoding unit implements two pre-encoding passes of a video frame with different QP values QP1 and QP2. The control logic captures the bitcounts for these two pre-encoding passes. In other implementations, the control logic performs more than two pre-encoding passes of a video frame with different QP values. The bitcount b1 corresponds to the pre-encoding pass with QP1 and is labeled with 510 on plot 505. The bitcount b2 corresponds to the pre-encoding pass with QP2 and is labeled with 515 on plot 505. After capturing bitcounts b1 and b2 for the pre-encoding passes with QP1 and QP2, respectively, the control logic generates plot 505 to map the relationship between bitcount and QP. Then, when a desired bitcount target 520 is determined, the control logic maps the target 520 to a QP value of QP3 on plot 505. Then, the encoder sets the QP to the QP3 value when encoding the video frame and/or one or more subsequent video frames. Alternatively, the encoder uses the QP3 value when encoding one or more portions (e.g., blocks, coding units) of the video frame and/or one or more portions of other video frames.

Figure 6:
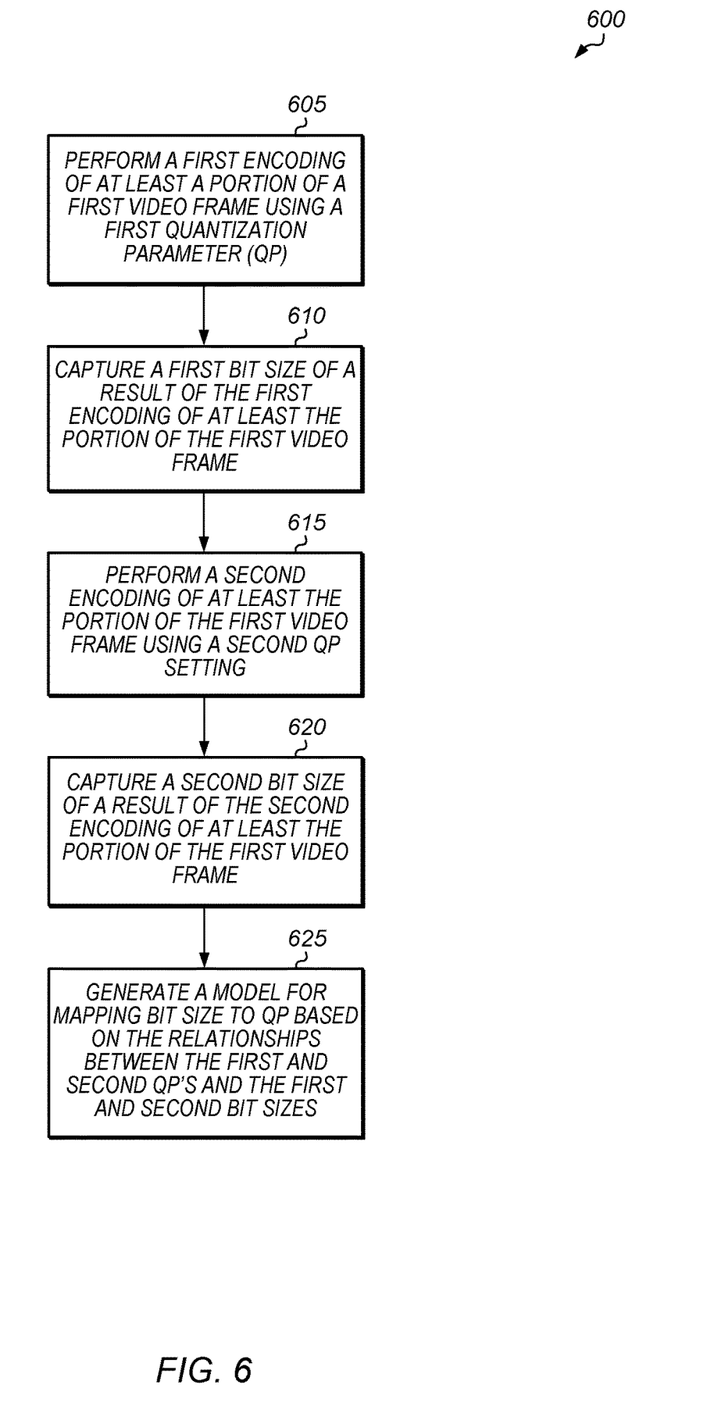
FIG. 6 is a generalized flow diagram illustrating one implementation of a method for generating a mapping to map bit size to QP.
Figure 7:
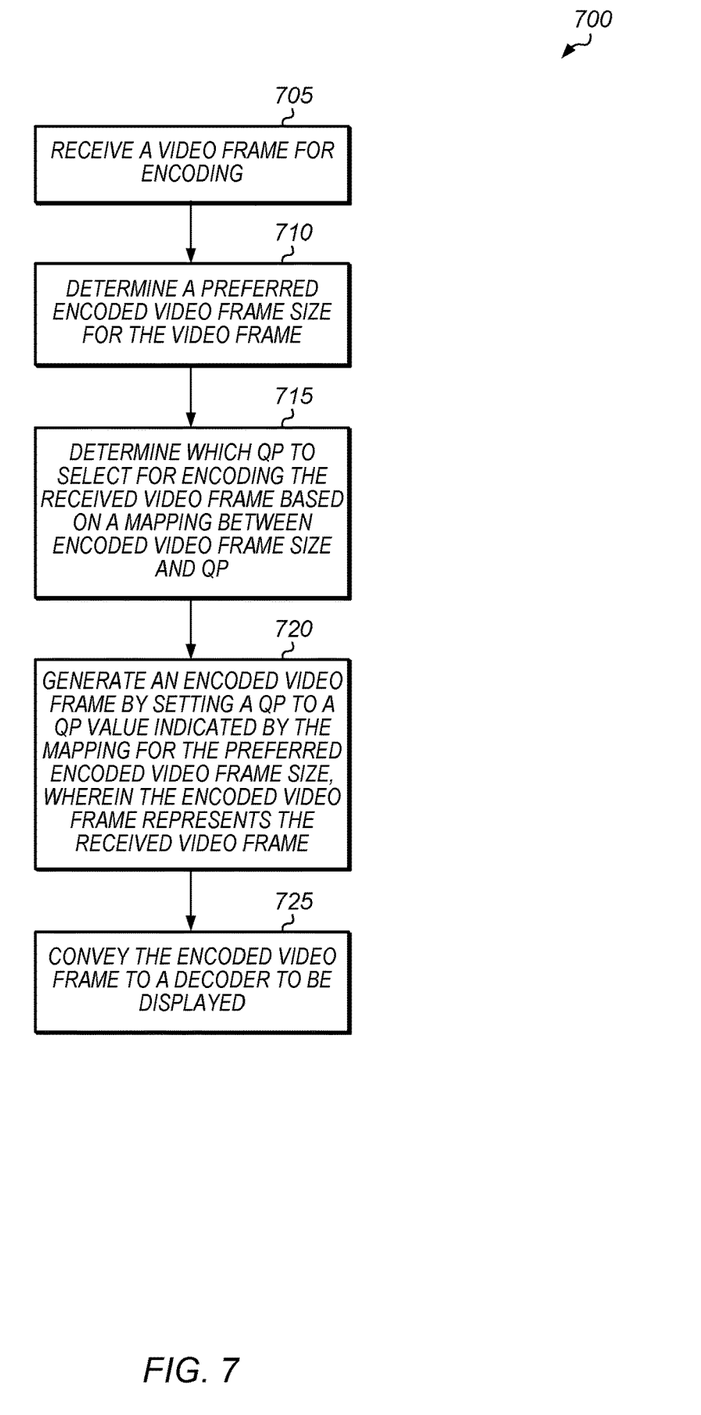
FIG. 7 is a generalized flow diagram illustrating one implementation of a method for encoding a video frame.

Turning now to FIG. 6, one implementation of a method 600 for generating a model to map bit size to a quantization parameter (QP) is shown. For purposes of discussion, the steps in this implementation and those of FIG. 7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A pre-encoder performs a first encoding of at least a portion of a first video frame using a first quantization parameter (QP) setting (block 605). Then, the pre-encoder captures a first bit size of the encoded portion of the first video frame (block 610). It is noted that the term "bit size" can also be referred to as "bitcount" herein. Next, the pre-encoder performs a second encoding of at least the portion of the first video frame using a second QP setting (block 615). It is assumed for the purposes of this discussion that the second QP setting is different from the first QP setting. It is noted that the first and second encodings can also be referred to as "pre-encodings". Then, the pre-encoder captures a second bit size of the encoded portion of the first video frame (block 620). Next, the pre-encoder generates a model from for mapping bit size to QP based on the relationships between the first and second QP's and the first and second bit sizes (block 625). After block 625, method 600 ends. It is noted that the "model" can also be referred to herein as a "mapping". In one implementation, the model is generated by solving for the values of α and β in the equation: bit-size=$\alpha 2^{\beta*QP}$. For example, the values of α and β are solved using the first and second bit-sizes generated by the first and second encodings using the first and second QP's, respectively. In other implementations, the model is generated using other techniques.

In some implementations, the pre-encoder performs more than two different encodings with more than two different QP settings. The pre-encoder then uses the more than two different QP settings (and corresponding bit sizes) to generate the model of QP versus bit size. It is noted that method 600 can be performed on a regular or periodic basis, depending on the implementation. In one implementation, method 600 is performed for each portion of a given video frame. In another implementation, method 600 is performed for each video frame of a video stream. In a further implementation, method 600 is performed once every N video frames, wherein N is a positive integer greater than one. The frequency with which method 600 is performed can alternate between these examples based on one or more factors. In other implementations, subsequent iterations of method 600 are performed according to other schedules.

Referring now to FIG. 7, one implementation of a method for encoding a video frame is shown. An encoder receives a video frame for encoding (block 705). The encoder determines a preferred encoded video frame size for the video frame (block 710). Depending on the implementation, the encoder receives a preferred encoded video frame size from another processing unit, the encoder retrieves the preferred encoded video frame size from a register or other memory location, the encoder calculates the preferred encoded video frame size based on a target bit rate of an encoded bitstream, or the encoder determines the preferred encoded video frame size in other manners.

The encoder determines which QP to select for encoding the received video frame based on a mapping between encoded video frame size and QP (block 715). One example of how to generate a mapping which maps bit-size to QP is described in the above discussion regarding method 600 (of FIG. 6). Next, the encoder generates an encoded video frame by setting a QP to a QP value provided by the model for the preferred encoded video frame size, wherein the encoded video frame represents the received video frame (block 720). Depending on the implementation, the mapping is implemented in a variety of different manners. In one implementation, the mapping is setup directly by a software application. In another implementation, the mapping is implemented as a lookup table process derived by running a plurality of experiments. In a further implementation, the mapping is implemented as a closed-loop control method which checks whether the stimuli applier drives the system closer to a desired outcome (e.g., a preferred bit-rate). In other implementations, the mapping is implemented using machine learning techniques, a neural network, a regressive model, or other types of models that use quality metrics (e.g., peak signal-to-noise ratio (PSNR), structural similarity (SSIM) index, video multimethod assessment fusion (VMAF)) to optimize settings which impact perceptual quality.

After block 720, the encoder conveys the encoded video frame to a decoder to be displayed (block 725). After block 725, method 700 ends. It is noted that method 700 can be repeated for each video frame received by the encoder. It is also noted that the mapping can be updated for each portion of the subsequent video frame, for each subsequent video frame, or after two or more video frames have been encoded.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a pre-encoder comprising circuitry configured to generate a mapping of frame size to quantization parameter (QP) based on a plurality of pre-encoding passes of a portion of a first video frame using different QP settings, wherein the mapping defines an exponential relationship between frame size and QP; and
   an encoder different from the pre-encoder comprising circuitry configured to:
   determine a given QP value from the mapping based on a preferred encoded video frame size;
   generate an encoded video frame by setting a QP to the given QP value for at least a portion of the encoded video frame, wherein the encoded video frame represents an input video frame; and
   convey the encoded video frame to a decoder to be displayed.

2. The system as recited in claim 1, wherein the pre-encoder is further configured to:
   perform a first encoding of at least the portion of the first video frame using a first QP setting;
   capture a first size of a result of the first encoding;
   perform a second encoding of the portion of the first video frame using a second QP setting;
   capture a second size of a result of the second encoding; and
   generate the mapping of frame size to QP based on relationships between the first and second QP settings and the first and second sizes, respectively.

3. The system as recited in claim 2, wherein the portion of the first video frame is downscaled prior to the first encoding and the second encoding being performed.

4. The system as recited in claim 2, wherein the encoder is configured to determine how to set an initial QP when encoding a final pass of the first video frame based on the mapping generated by the pre-encoder.

5. The system as recited in claim 1, wherein the pre-encoder is further configured to generate a different mapping for each portion of the first video frame, wherein one or more of the different mappings define a different exponential relationship between size of the portion and QP.

6. The system as recited in claim 1, wherein the input video frame is the first video frame.

7. The system as recited in claim 1, wherein the input video frame is a second video frame which is subsequent to the first video frame in a video sequence.

8. A method comprising:
generating, by a pre-encoder, a mapping of frame size to quantization parameter (QP) based on a plurality of pre-encoding passes of a portion of a first video frame using different QP settings, wherein the mapping defines an exponential relationship between frame size and QP;
determining, by an encoder different from the pre-encoder, a given QP value from the mapping based on a preferred encoded video frame size;
generating, by the encoder, an encoded video frame by setting a QP to the given QP value for at least a portion of the encoded video frame, wherein the encoded video frame represents an input video frame; and
conveying, by the encoder, the encoded video frame to a decoder to be displayed.

9. The method as recited in claim 8, further comprising:
performing, by the pre-encoder, a first encoding of at least the portion of the first video frame using a first QP setting;
capturing, by the pre-encoder, a first size of a result of the first encoding;
performing, by the pre-encoder, a second encoding of the portion of the first video frame using a second QP setting;
capturing, by the pre-encoder, a second size of a result of the second encoding; and
generating, by the pre-encoder, the mapping of frame size to QP based on relationships between the first and second QP settings and the first and second sizes, respectively.

10. The method as recited in claim 9, wherein the portion of the first video frame is downsampled prior to the first encoding and the second encoding being performed.

11. The method as recited in claim 9, further comprising determining, by the encoder, how to set an initial QP when encoding a final pass of the first video frame based on the mapping generated by the pre-encoder.

12. The method as recited in claim 8, wherein the pre-encoder is further configured to generate a different mapping for each portion of the first video frame, wherein one or more of the different mappings define a different exponential relationship between size of the portion and QP.

13. The method as recited in claim 8, wherein the input video frame is the first video frame.

14. The method as recited in claim 8, wherein the input video frame is a second video frame which is subsequent to the first video frame in a video sequence.

15. An apparatus comprising:
a memory; and
an encoder coupled to the memory, wherein the encoder comprising circuitry configured to:
determine a given quantization parameter (QP) value from a mapping based on a preferred encoded video frame size, and wherein the mapping specifies a relationship between bit size to QP based on two or more pre-encoding passes of a portion of the first video frame using different QP settings by a pre-encoder different from the encoder comprising circuitry configured to generate the mapping, wherein the mapping defines an exponential relationship between frame size and QP;
generate an encoded video frame by setting a QP to the given QP value for at least a portion of the encoded video frame, wherein the encoded video frame represents an input video frame; and
convey the encoded video frame to a decoder to be displayed.

16. The apparatus as recited in claim 15, wherein the two or more pre-encoding passes are performed on a portion of a first video frame which is downsampled prior to the two or more pre-encoding passes.

17. The apparatus as recited in claim 15, wherein the two or more pre-encoding passes are performed on a portion of a first video frame which is pre-processed prior to the two or more pre-encoding passes.

18. The apparatus as recited in claim 15, wherein the encoder is configured to determine how to set an initial QP when encoding a final pass of the first video frame based on the mapping.

19. The apparatus as recited in claim 15, wherein the pre-encoder is further configured to generate a different mapping for each portion of the first video frame, wherein one or more of the different mappings define a different exponential relationship between size of the portion and QP.

20. The apparatus as recited in claim 15, wherein the two or more pre-encoding passes are performed on the input video frame.

* * * * *